July 31, 1934.  P. ZIMMERMANN  1,968,548
APPARATUS FOR THE CONTROL OF BLAST FURNACES
Filed March 18, 1929  10 Sheets-Sheet 1

July 31, 1934.   P. ZIMMERMANN   1,968,548
APPARATUS FOR THE CONTROL OF BLAST FURNACES
Filed March 18, 1929   10 Sheets-Sheet 3

Inventor:-
Paul Zimmermann

July 31, 1934.   P. ZIMMERMANN   1,968,548
APPARATUS FOR THE CONTROL OF BLAST FURNACES
Filed March 18, 1929   10 Sheets-Sheet 4

Inventor—
Paul Zimmermann

July 31, 1934.  P. ZIMMERMANN  1,968,548
APPARATUS FOR THE CONTROL OF BLAST FURNACES
Filed March 18, 1929    10 Sheets-Sheet 6

Inventor:
Paul Zimmermann

July 31, 1934.   P. ZIMMERMANN   1,968,548
APPARATUS FOR THE CONTROL OF BLAST FURNACES
Filed March 18, 1929   10 Sheets-Sheet 8

Patented July 31, 1934

1,968,548

UNITED STATES PATENT OFFICE 1,968,548

APPARATUS FOR THE CONTROL OF BLAST FURNACES

Paul Zimmermann, Chicago, Ill., assignor to H. A. Brassert & Company, Chicago, Ill., a corporation of Illinois Application March 18, 1929, Serial No. 347,815

1 Claim. (Cl. 33—125)

This invention relates to improvements in apparatus for the control of blast furnaces and generally to apparatus which will cause the synchronous and automatic operation of the small and large bell valves at the top of the blast furnace and at the same time allow the continuous operation of a stock line recorder.

The development of apparatus for indicating the stock line or burden level of a blast furnace has proceeded along several different lines. As examples of past practice one method has involved the measurement of the burden level at regular intervals. At first the plumb was manually operated by a hand winch, and the man in charge of filling the furnace lowered the plumb at intervals of, perhaps, 10 minutes, and recorded the burden level. Later on an electric winch was used, and operated from time to time in a similar manner. A continuous recorder was finally developed which included an electric motor with a series switch, whereby the plumb is automatically lowered at regular intervals to the burden level. In such type the level of the burden is proportional to the number of rotations of the rope drum, and a recorder connected to the shaft registers the movement of the plumb. In other types the plumb is allowed to remain at, and follow the burden level, and it is only lifted just prior to the lowering of the large bell at the introduction of a new charge. The complicated switching device is liable to function inaccurately, and this causes trouble. Furthermore the provision of a separate motor for raising the plumb involved a needless and useless expense.

Prior construction of apparatus for operating the charging means has been found inefficient, and depend a great deal on manual control by an operator. Thus it has been necessary for the operator to manually start the mechanism for raising a skip load of material and at the same time open the small bell by suitable additional mechanism. Finally after a desired number of skip loads have been raised and dumped, the operator must start additional mechanism to open the large bell valve.

It is a purpose of my invention to provide a control apparatus for blast furnaces, so arranged that there is a continuous indication of the burden level, and the stock line plumbs are intermittently raised prior to the opening of the large bell by mechanism actuated from the rotation of the skip hoist drum. I intend to include within this general purpose the raising of the plumb through mechanical connection with the shaft of the skip hoist drum, or a construction in which the rotation of the skip hoist drum sets in operation other mechanism, which may have as a power source air or steam, to cause the lifting of the plumb.

It is further a purpose of my invention to indicate the burden level both by recorders that have mechanical connection with the raising means which moves proportional to the level of the plumb, and recorders having electrical connection with the same means. Therefore, in the event of failure of the electrical devices the mechanical recorders may be fully depended upon.

An additional novel feature of my invention is the provision of a plurality of independent stock line plumbs, each of which is connected to separate recorders, so that the average reading of the recorders will give a more correct indication of the burden level to the operator. The cables for the plumbs pass around lifting sheaves mounted for free rotation, then around idler pulleys and finally are secured to counter-weights. The movement of the plumb, therefore, causes a proportionate movement of the sheave. The raising means initially picks up the sheave connected to the lowest plumb and finally the other sheave so that they are both moved and the plumbs raised together.

Another purpose of my invention consists in the provision of apparatus whereby the operator only needs to control the rotation of the skip hoist drum. The other operations, such as the opening and closing of the small and large valves, will automatically and synchronously take place.

As an additional feature of novelty in connection with the last mentioned purpose I provide locking features whereby the operator may prevent the automatic operation at any time, should he desire to dump an additional skip load, or to raise the plumbs while the large valve is not open. This locking means and independent control is so arranged that the synchronism of the automatic operation is not disturbed, that is, the operator after he locks the automatic operation and dumps the additional skip load may release the locking means and the synchronous automatic operation will continue as before.

Additional and further objects and advantages of my improvements will be more readily apparent as the invention is more fully described in connection with the attached drawings.

I have illustrated certain preferred embodiments of my invention in the accompanying drawings in which—

Figure 1:
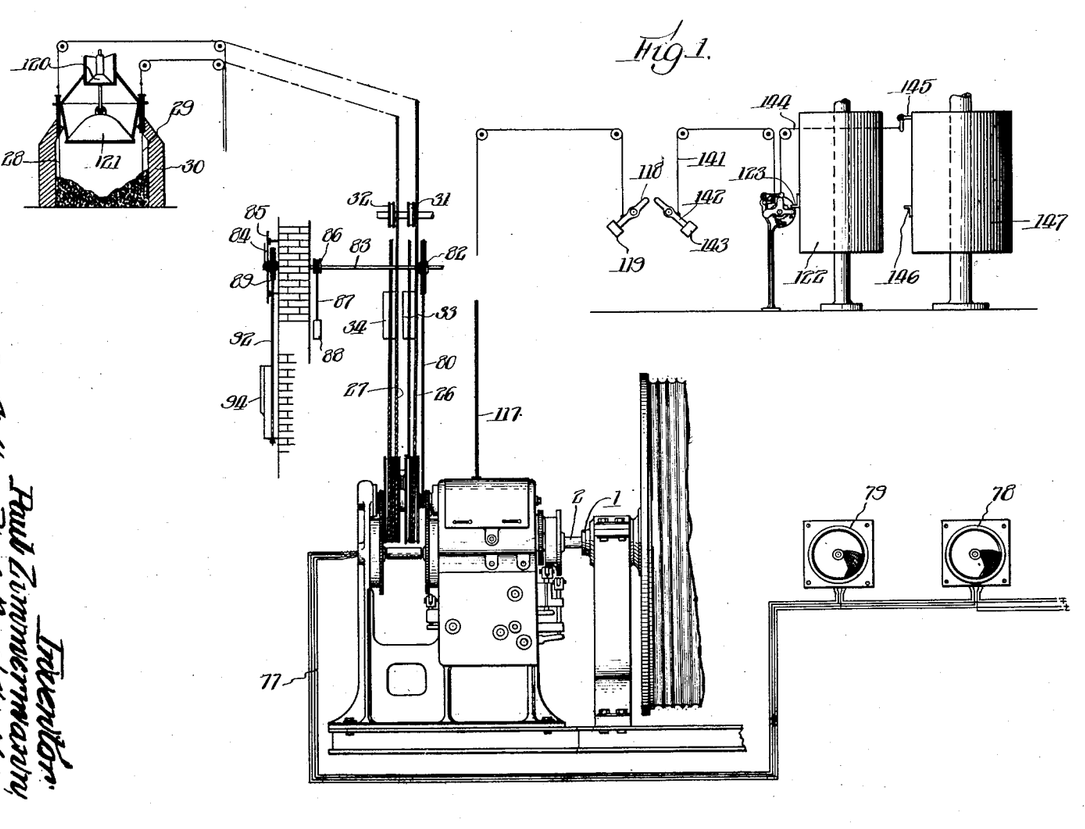
Figure 1 is a general layout of one form of apparatus shown somewhat diagrammatically.
Figure 2:
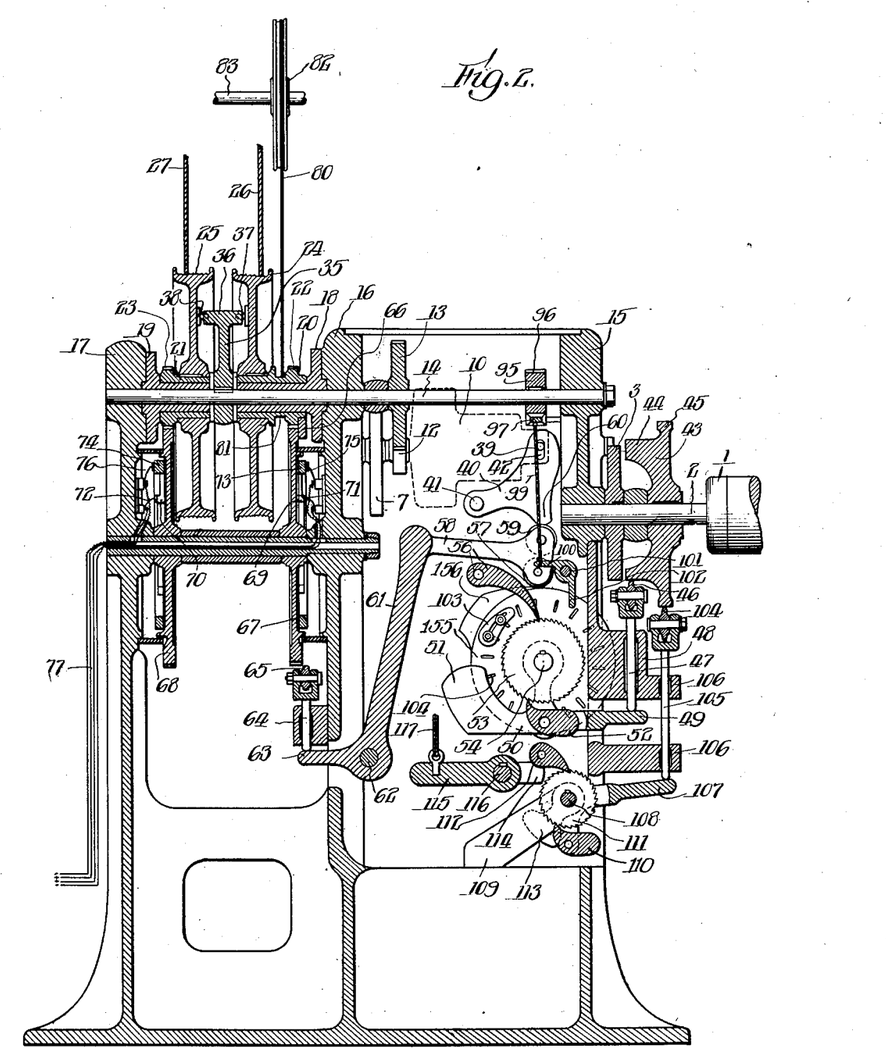
Figure 2 is a vertical section of the control apparatus of Figure 1.
Figure 3:
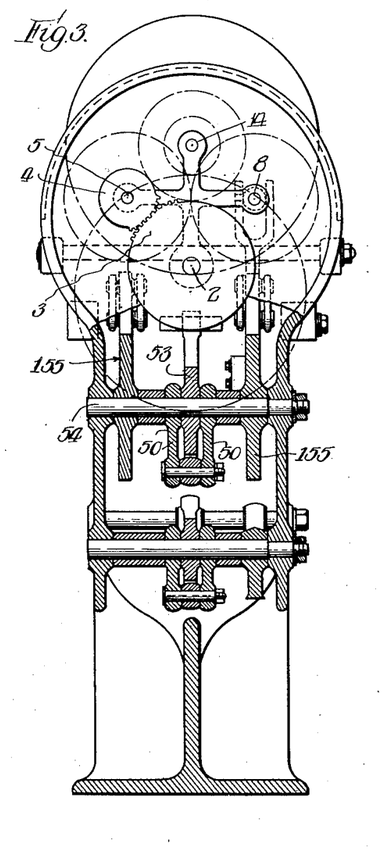
Figure 3 is an elevation partly in section of the construction shown in Figure 2, as seen from the right.
Figure 4:
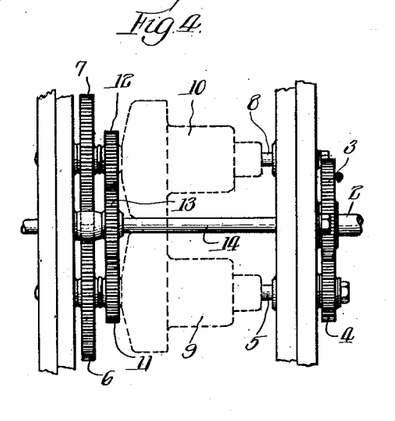
Figure 4 is a fragmentary plan view of certain of the gears and shafts of Figures 2, 3 and 4.
Figure 5:
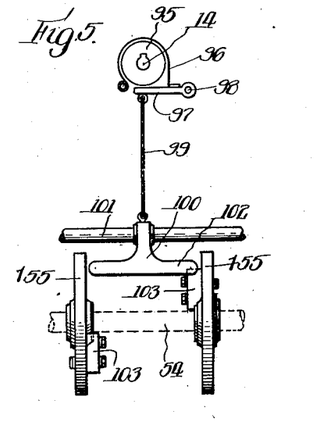
Figure 5 is a view of the brake mechanism of Figure 2 as seen from the right.

Referring first to the form of construction shown in Figures 1 to 10, inclusive, the shaft 1 is an extension of the skip hoist drum axle or a shaft driven in any desired manner from the skip hoist drum operating mechanism. The smaller shaft 2 extends from the shaft 1 and turns with it, the shaft 2 having the gear 3 keyed thereto. As shown in Figures 3 and 4, the gear 3 meshes with the gear 4, keyed to shaft 5, and as shown in Figure 4, the shaft 5 carries the gear 6 keyed thereto. The gear 6 meshes with the gear 7 keyed to shaft 8.

It will thus be apparent that the shafts 5 and 8 are rotated in opposite directions by the rotation of the skip hoist drum. These shafts 5 and 8 carry the clutches 9 and 10 respectively, which clutches serve to clutch the gears 11 and 12 to the shafts. Both the gears 11 and 12 mesh with gear 13 keyed to shaft 14. The action of the clutches 9 and 10 is such that only one of the gears 11 and 12 will be clutched to its shaft at a time and this construction insures that the shaft 14 will always be rotated in the same direction regardless of the direction of rotation of the shaft 1, which, in the operation of the skip hoist drum will be repeatedly reversed in its direction of rotation.

The shaft 14 is supported in bearings in the frame sections 15, 16 and 17. The shaft 14 is also carried by the bearing sleeves 18 and 19. The gear sleeves 20 and 21 are rotatably carried by the bearing sleeves 18 and 19 and these gear sleeves are provided with the integral gears 22 and 23. The plumb cable sheaves 24 and 25 are keyed to the gear sleeves 20 and 21 respectively, and rotate with these sleeves, which sleeves are independent of the shaft 14 in their rotation. The sheaves 24 and 25 carry the plumb weight cables 26 and 27 which are connected to the plumb weights 28 and 29 in the top of the blast furnace 30 and shown diagrammatically in Figure 1. The cables 26 and 27 are wrapped about the sheaves 24 and 25 and their other ends pass over pulleys 31 and 32 and carry counterweights 33 and 34 which hold the cables taut.

The arm 35 is keyed to the shaft 14 between the sleeves 18 and 19 and carries the actuating end 36 adapted to engage the pins 37 and 38 carried by the sheaves 24 and 25. Consequently, when shaft 14 is rotated in the clockwise direction, as seen from the right of Figure 2, the arm serves to rotate the sheaves 24 and 25 in the clockwise direction and to wind up the cables and raise the plumbs.

The clutches 9 and 10 are provided with operating pins 39, as shown in Figure 2, and the clutch operating levers 40 are pivoted on a shaft 41 and are provided with slotted openings 42 in which the pins 39 fit. With the levers 40 in their lower position as shown in Figure 2, the clutches are in inoperative position and no power is transmitted to shaft 14, the gears 11 and 12 turning freely on their shafts 5 and 8. The shaft 2 rotates whenever the skip is operated and this operates the gears 3 and 4, and through shaft 5, the gears 6 and 7, but, as stated above, with the clutches inoperative the shaft 14 is not rotated and the stock line plumbs are not operated. It is not desired to operate them continuously and the mechanism to be described hereafter insures operation only at the time of the operation of the large bell. The plumbs are lifted before opening the large bell, and after the bell is opened and the charge deposited, the plumbs are lowered into contact with the burden in the furnace.

Figure 6:
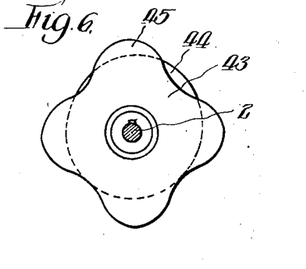
Figure 6 is a view of the double cam wheel of Figure 2 as seen from the right.

The shaft 2 carries the double cam wheel 43 shown in face view in Figure 6. This wheel 43 carries the two cam surfaces 44 and 45. The cam 45 operates the small bell operating mechanism which will be described later. The cam 44 bears upon the roller 46 which is carried by the push rod 47 which latter fits in bearings in the frame section 48. The lower end of the push rod 47 engages the arm 49 which is an integral part of the rocker 50 which has the counterweight 51 to maintain it in position engaging the push rod. The rocker 50 carries the pivoted ratchet 52 which is so weighted as to constantly engage the ratchet wheel 53 which is keyed to shaft 54. The pivoted pawl 56 engages the wheel 53 to prevent counterclockwise rotation.

It will be apparent that the push rod 47 will be depressed once by cam 44 during each rotation of shaft 2, regardless of the direction of rotation of the shaft. As the push rod 47 goes down, it swings the rocker 50 in the clockwise direction and the pawl 52 rotates the ratchet wheel 53 and shaft 54 in the clockwise direction for a portion of a revolution. By properly proportioning the cam 44 and the ratchet wheel 53, the shaft 54 may make a complete revolution when the shaft 2 makes a given desired number of revolutions. Thus these parts may be so proportioned that a rotation of the ratchet 53 will coincide with the desired interval between operations of the large bell as measured in travels of the skips which correspond to a predetermined number of rotations of the skip hoist shaft 2. For example, if the shaft 2 rotates twelve times for each travel of a skip and five or six skips are dumped between openings of the large bell, there will be sixty movements of the push rod 47 and rocker 50, and if the ratchet wheel moves one tooth for each movement, it should have sixty teeth.

The shaft 54 carries the wheels 155 which have the cam surfaces 156. These surfaces 156 engage the rollers 57 carried by the arm 58, which also carries the rollers 59. The rollers 59 engage extensions 60 in the lower portions of the clutch operating levers 40. The arm 58 extends from the bell crank lever 61 which is pivoted at 62 and has the lower arm 63 which supports the push rod 64. This push rod carries the roller 65 which is engaged by the cam lug 66 which extends laterally from the gear 67. The cam lug 66 is at its lowest position when the stock line plumb 29 is at the top of the furnace and in this position engages roller 65 and pushes down pin 64 to turn lever 61 by arm 63 in a counter-clockwise direction. Thus the roller 59 is moved away from the high point 60 of the clutch shifting cam lever 40 with which it is in engagement. The cam lever 40 may then drop and release the clutch. Further movement of the stock line plumbs is thereby prevented.

The gears 67 and 68 are similar and mesh with the gears 22 and 23 respectively, which gears are formed on the sleeves 20 and 21 to which the stock line indicator sheaves 24 and 25 are keyed. Consequently, the gears 67 and 68 rotate with the stock line indicator sheaves. The gears 67 and 68 and 22 and 23 are so proportioned that the gears 67 and 68 make only one complete revolution for the entire range of movement of the stock line indicators.

The gears 67 and 68 carry the contactor rings 69 and 70 which are engaged by the contactor brushes 71 and 72 respectively. These contactor rings 69 and 70 are each connected to an end of the resistance rings 73 and 74 which are also carried by the gears 67 and 68. The contacts 75 and 76 engage the resistance rings and pass over their surfaces as the gears rotate. The contacts 71, 72, 75 and 76 are each connected to wires which are carried out of the apparatus as shown at 77, and lead to the recorders 78 and 79, shown in Figure 1.

It will be understood that the pair of contacts associated with each of the gears will have connected between them a portion of the resistance carried by the gear, the amount of the portion of resistance depending upon the rotary position of the gears. This resistance will affect the current passing through the circuit which is connected to a suitable source of electric power. Consequently the resistance will control the electrical recorders which will thus indicate the position of the stock line plumb bobs and consequently the height of the stock in the furnace.

Figure 7:
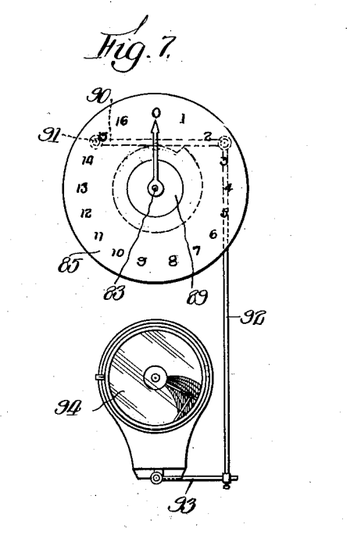
Figure 7 is a fragmentary face view of the mechanical stock line recorder of Figure 1.

A mechanical form of recorder is also shown in Figures 1, 2 and 7 which may be used to supplement the electrical form described above or may be used alone instead of the electrical device. This mechanical recorder comprises the cable 80 which is secured to the sleeve 20 in the circumferential groove 81 formed in the sleeve. The cable 80 passes over sheave 82 on shaft 83. As shown in Figures 1 and 7, the shaft 83 carries a pointer 84 in front of the dial 85. It will be understood that the dial will be calibrated and marked so as to show the height of the stock line. In order to hold the cable 80 taut at all times, the shaft 83 is provided with pulley 86, cable 87 and counterweight 88.

The above described mechanical indicator gives only an indication at the time and if desired, mechanical means may be provided to give a continuous record. For this purpose the shaft 83 carries a cam 89 upon which rides the link 90 which is pivotally supported at 91. This link 90 is connected to link 92 which is connected in turn to link 93. The link 93 is connected to the recorder 94.

The apparatus for elevating the plumb bobs has been described together with the mechanism which cuts off the power when the plumbs are elevated to their maximum height. As was explained, this elevation should take place just prior to the opening of the large bell to admit a charge to the furnace. The plumbs should be held elevated until the charge is deposited and the large bell lowered. This is accomplished by the brake drum 95 on shaft 14, and the brake band 96. The band 96 is operated by means of brake lever 97. This lever 97 is pivoted at 98 and is connected by cable 99 to the brake operating bell crank 100. This bell crank is pivoted on shaft 101 and has the arms 102 which are adapted to be engaged by the cams 103 carried on the sides of the wheels 155. As shown in Figure 2 a plurality of slots 104 are provided in the wheels 155 so that the location of the cams 103 may be suitably adjusted. It will be noted that the cams 103 will normally be so located relative to cams 156 that the brake will be applied shortly after the cam 156 has operated to throw the clutches in to raise the plumbs. The brake will be of such strength as not to stall the rotation of shaft 14 under power, but to prevent the reverse rotation of the shaft under the weight of the plumbs after the power is cut off.

It will be apparent that the cams 103 will engage arms 102 to swing the bell crank 100 in the counter-clockwise direction, as seen in Figure 2, to pull down on the cable 99 and consequently to apply the brake. As the wheels 155 continue to be rotated, the cam 103 is carried past the arms 102 and the bell crank returns to the position of Figure 2 by gravity, thus releasing the brake, and the plumbs drop until stopped by the burden. As they drop the shaft 14 is rotated in the reverse direction due to contact between the pins 37 and 38 and the actuating end 36 of the arm 35. It is immaterial if one plumb and the associated pin stops before the other, as the remaining pin will carry the arm on.

The mechanism for operating the small bell includes the cam wheel 45 on the shaft 2, which cam wheel works against the roller 104 carried by the push rod 105, which is carried in bearings 106 in the frame of the apparatus. The push rod 105 engages the ratchet arm 107 pivoted on shaft 108 and provided with the counterweight 109 to hold it against the push rod. The ratchet arm 107 carries the ratchet pawl 110 which is so pivoted and weighted as to be maintained in contact with the ratchet wheel 111 which is keyed to the shaft 108. The pawl 112 is provided to prevent reverse movement of the ratchet wheel 111 and shaft 108. The bell operating cam 113 is also keyed to shaft 108 and is adapted to engage the end 114 of the small bell operating lever 115. This lever 115 is pivoted at 116 and has the operating cable 117 secured to it. As shown in Figure 1, this cable is connected to the small bell operating valve handle 118. This handle is provided with the counterweight 119 which returns the valve to the closed position when the pull on the cable 117 is released.

It will be understood that the number of high points on the cam wheel 45 and the number of teeth on the ratchet wheel 111 will be so related with the movement of the skips as to cause the cam 113 to engage lever 114 to operate the small bell 120 at the proper times and at proper intervals.

The large bell 121 is operated by mechanism located adjacent the small bell air cylinder or counterweight 122, the mechanism being actuated by the arm 123 secured to the air cylinder. This arm 123 engages the adjustable contact screw 124 which is carried by the rotating lever 125. The lever 125 rotates about shaft 126 carried upon the standard 148 and is provided with a counterweight 127 adapted to swing by gravity against the stop 128. The lever 125 also carries the operating pawl 129 which engages the ratchet wheel 130. The pawl 131 pivoted at 132 upon the standard 148 prevents backward rotation of the ratchet wheel 130.

The operating wheel 133 is keyed to the shaft 126 and rotated by rotation of the ratchet wheel 130. The operating wheel 133 has four pins 134 which are adapted to engage the cross pin 135 carried by the operating link 136. This link 136 is pivotally connected at 137 to the arm 138 which is keyed to shaft 139. The operating arm 140 is also keyed to shaft 139 and is connected by cable 141 to the large bell valve operating lever 142. This lever 142 is provided with the counterweight 143 which normally maintains the valve closed. The link 136 is connected by cable 144 with bell crank lever 145 which is pivotally supported so as to have one arm engaged by the lug 146 carried by the large bell air cylinder 147 when that weight rises as the large bell is opened.

Figure 8:
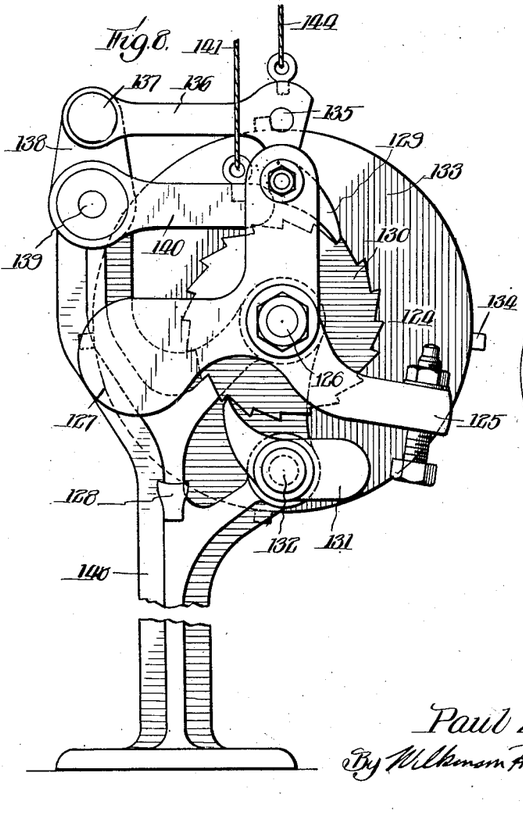
Figure 8 is a side elevation of the large bell operating mechanism.

In the operation of this device, the lever 125 rotates in the counterclockwise direction as the small bell air cylinder rises and the arm 123 moves away from stud 124. This rotation continues until counterweight 127 engages stop 128. As the air cylinder 122 is lowered in closing the small bell, the arm 123 engages stud 124 and rotates lever 125 in the clockwise direction. During this clockwise rotation the pawl 129 engages ratchet wheel 130 and rotates it and shaft 126 in the clockwise direction. This action continues as the small bell is opened and closed. When the shaft 126 has been rotated to cause a pin 134 on wheel 133 to engage the pin 135, this pin and link 136 are drawn to the right, as seen in Figure 8. As link 136 moves to the right, it pulls on arm 138 and causes shaft 139 to rotate in the clockwise direction and to swing the arm 140 downwardly, pulling down on cable 141 and opening the large bell operating valve by swinging handle 142.

As the large bell is lowered, the air cylinder 147 rises and the lug 146 engages the bell crank lever 145 and rotates that lever to pull on cable 144. This pull on cable 144 lifts the link 136 to cause the cross pin 135 to clear the pin 134. The counterweight 143 pulling on cable 141, then lifts the arm 140, and also closes the valve to lift the large bell and lower the air cylinder 147. As the air cylinder 147 is lowered, the lug 146 leaves the bell crank 145 which releases the pull on cable 144 and lowers the cross pin 135 to rest on the edge of wheel 133 where it may be engaged by the next pin 134 as the cycle of operation continues.

It will be understood that the ratchet wheel 130 and the number and location of pins 134 will be so proportioned and designed as to cause an operation of the large bell after any desired predetermined number of operations of the small bell. If an extra opening of the small bell is desired between openings of the large bell, this may be done without affecting the cycle of operation if the lever 125 is held against rotation as the small bell air cylinder goes up upon the extra operation of the small bell.

Figures 11 to 20 show another embodiment of my apparatus in which the valve for operating the small bell is actuated directly from the rotation of the skip hoist drum similarly to the manner previously described but instead of causing lifting of the stock line plumbs through mechanism actuated directly from the rotation of the skip hoist drum, I have shown in this form a means set in operation by the movement of the small bell air cylinder to cause the actuation of pneumatic means which, in turn, causes the lifting of the stock line plumbs after a plurality of operations of the small bell. The mechanism for opening the valve to cause the operation of the large bell is directly associated with the mechanism operated from the small bell air cylinder for causing the actuation of the pneumatic means. In addition, in this type I have shown means for preventing the raising of the stock line plumbs or the opening of the large bell in order to permit the opening of the small bell an extra number of times without interfering with the synchronous operation of the complete apparatus.

Figure 11:
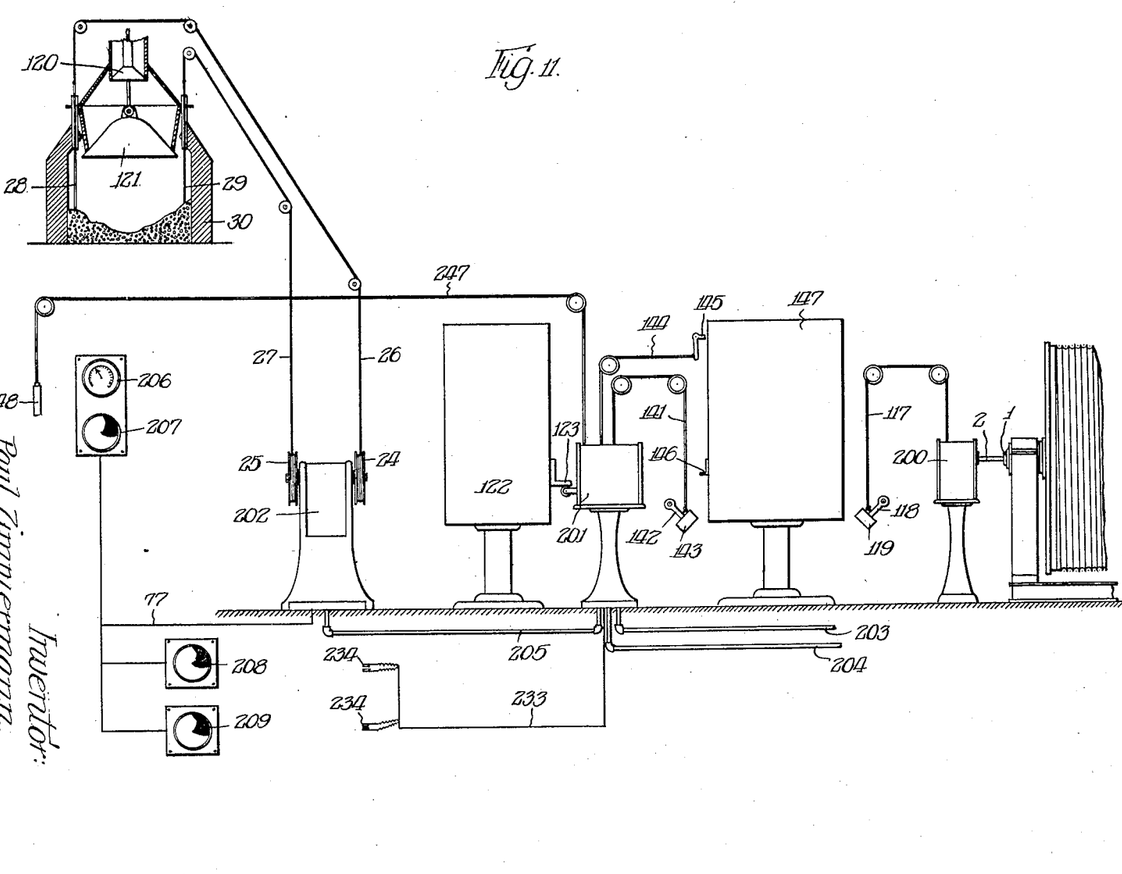
Figure 11 is a general layout similar to Figure 1 of a modified plan of apparatus.

With reference to Figure 11 the parts which are similar to those previously described have been designated by the same numerals. I show the top end of a blast furnace at 30 and stock line plumbs 28 and 29 for indicating the level of the burden. The stock line plumbs may be raised through cables 26 and 27 which may be moved by the rotation of sheaves 24 and 25.

The shaft 1 of the skip hoist drum is shown connected to the smaller extension shaft 2 which extends into a housing 200 enclosing mechanism for pulling on cable 117 upon each raising of a skip load by rotation of the skip hoist drum. The cable 117 is connected to a valve lever 118 carrying a counterweight 119. The valve 118, as previously described, will cause the opening of the small bell 120 and the raising of the small bell air cylinder 122. The small bell air cylinder 122 has attached thereto bracket projections 123 which will cause the operation of mechanism enclosed in housing 201 and a pull-on cable 141 after a desired number of operations of the small bell. The cable 141 is connected to a valve lever 142 having a counterweight 143. Valve 142, as previously described, will cause the opening of the large bell 121 and the raising of the large bell counterweight or air cylinder 147. The large bell air cylinder 147 has a bracket projection 146 which cooperates with a bell crank lever 145 and pulls on a cable 144 in order to allow the closing of the valve 142 by means of the counterweight 143.

Thus far the operation as described is similar to that of the type first described although it is apparent that the arrangement of the apparatus is somewhat different. The different operation resides in the actuation of the mechanism for raising the plumb lines prior to the opening of the large bell. This mechanism is enclosed in housing 202 and, instead of being actuated directly from the rotation of the skip hoist drum, the operation is effected by pneumatic or steam means initially set in operation by the actuation of mechanism enclosed in housing 201.

In Figure 11 is shown an air pressure line 203, a pipe 204 which is vented to the atmosphere, and a pipe 205 all extending into housing 201. The pipe 205 extends from the housing 201 into the housing 202. Mechanism enclosed in housing 201 will cause the operation of a valve to admit air pressure from pipe line 203 to pipe line 205 thus causing the rotation of sheaves 24 and 25 and the raising of the stock line plumbs 28 and 29. Upon further operation the valve enclosed in housing 201 is turned to open pipe line 205 to the vented pipe 204 thus allowing the stock line plumbs 28 and 29 to be again dropped into contact with the burden.

The meters, as indicators showing the level of the burden, may be electrically actuated in the manner previously described and I have shown wires 77 extending from housing 202 to a meter 206, recorder 207 and two-pen recorders 208 and 209. It is obvious that mechanical indicators could also be used, as in Figure 1.

Figures 12, 13, 14:
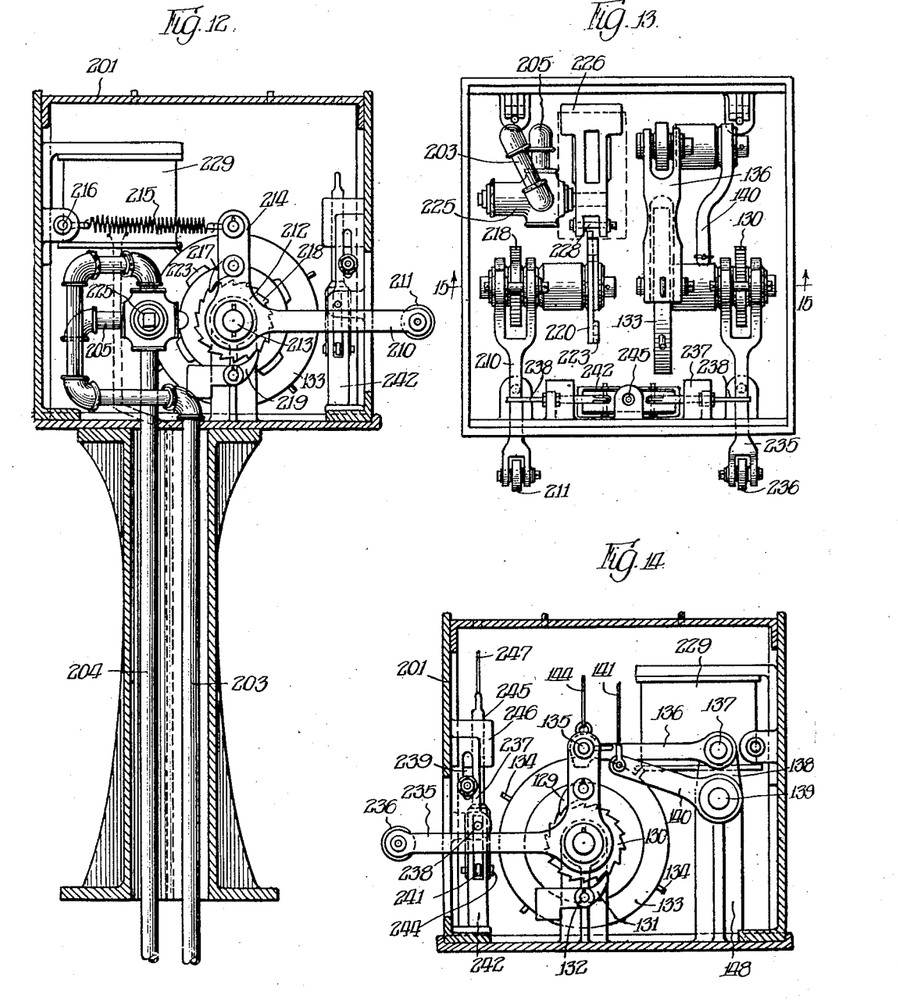
Figure 12 is a vertical section of the control box operated from the small bell air cylinder shown in Fig. 11.
Figure 13 is a horizontal plan view of a portion of the mechanism shown in Fig. 12.
Figure 14 is a vertical elevation from the right hand end of Fig. 13.
Figure 15:
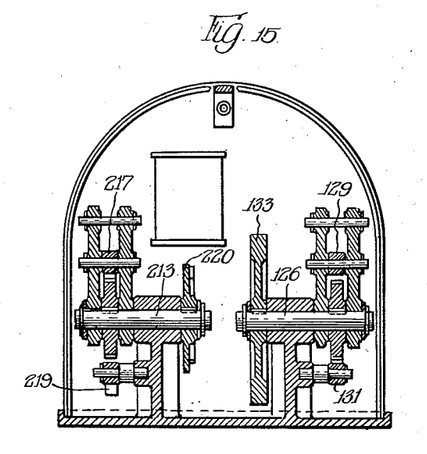
Figure 15 is a vertical sectional elevation on line 15—15 of Fig. 13.

In detail description with reference to Figures 12, 13 and 14, showing views of mechanism enclosed in housing 201, I show a lever 210 carrying a roller 211 at its outer end which cooperates with a bracket 123 on the small bell counterweight 122. The lever 210 is one arm of the bell crank lever 212 pivoted on shaft 213 having its other arm 214 attached to a spring 215.

The spring 215 is secured at 216 to the housing 201 and thus causes the lever 210 to follow the bracket 123 upon the upward movement of the small bell air cylinder 122. A ratchet 217 is attached to the arm 214 and engages a ratchet wheel 218 which is keyed to shaft 213. The counterweighted locking ratchet 219 is shown which prevents the reverse movement of ratchet wheel 218. At the other end of the shaft 213 from the ratchet wheel 218 is mounted a disc 220 having slotted openings 221. A member 222 having a plurality of projection teeth 223 is secured to the disc 220 by adjustable fastening means 224 extending through slots 221. The projections 223 operate as cam teeth and due to the provision of the slotted openings may be positioned in desired relation to the teeth of the ratchet wheel. A three-way valve 225 is connected to the pipes 203, 204 and 205, previously described. The valve 225 is operated by lever 226 having a counterweight 227 at one end and an operating pin 228 at the other end. The pin 228 cooperates with the cam teeth 223 thus after a plurality of movements of the lever 210 corresponding to the number of skip loads carried up and dumped during the opening of the small bell, one of the cam teeth 223 will engage the valve operating lever 226 and open the valve allowing air to flow from pipe 203 to pipe 205. The air flowing through pipe 205 will cause the raising of the stock line plumbs by the actuation of mechanism enclosed in housing 202. I have also shown in housing 201 a solenoid 229 secured to the housing 201 immediately over the valve 225. The operating arm 230 of the solenoid is attached by an intermediate lever 231 to the valve operating lever 226 by a slotted opening 232.

In Figure 11 is shown diagrammatically wires 233 and switches 234. The provision of the solenoid allows the closing of the switches 234, the movement of arm 230 and the opening of valve 225, thus causing the raising of the stock line plumbs. This may be done without disturbing the sequence of the other operations. Upon the opening of the circuit, the counterweight 227 will cause the valve 225 to close and the stock line plumbs will drop to the level of the burden of their own weight.

Figure 9:
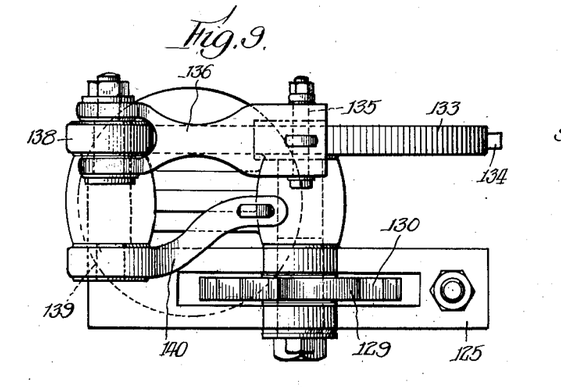
Figure 9 is a plan view of the apparatus of Figure 8.
Figure 10:
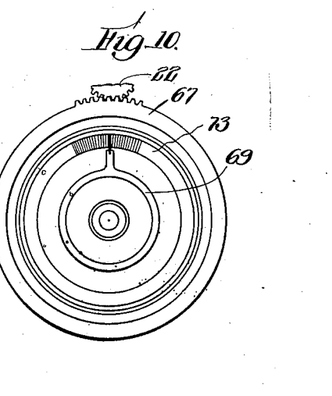
Figure 10 is a fragmentary face view of the electrical resistance mounting.

Contained in the same housing 201 I show a modification of the mechanism previously shown in Figures 8 and 9, thus:—the lever 235 having a roller 236 at its outer end which cooperates with the bracket 223 in the same manner as lever 210 and roller 211 corresponds to the operation of arm 125 of Figure 8. Since the remainder of the mechanism is substantially the same as Figure 8, the same reference numerals will be used as in Figure 8.

The actuation of arm 235 a plurality of times will cause actuation of lever 142 and open the large bell 121 at a time immediately following the raising of the stock line plumbs 28 and 29. By mounting the levers 210 and 235 in housing 201 in positions parallel to each other, I am able to use common locking means for preventing the movement of both levers. This may be done in order to permit the operation of the small bell an extra number of times without disturbing the sequence or synchronism of further operation.

Figure 16:
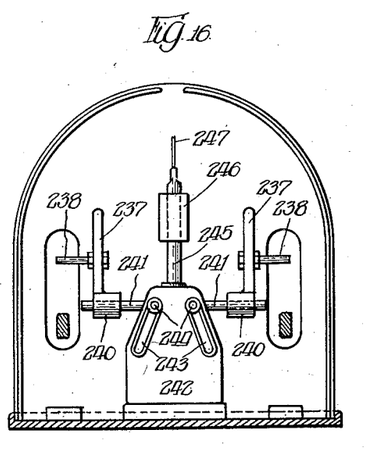
Figure 16 is a vertical sectional elevation showing the locking mechanism of Figures 12 to 14.
Figure 17:
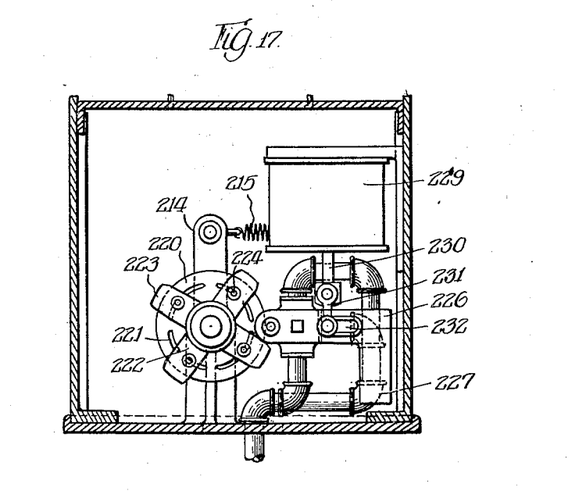
Figure 17 is a vertical elevation showing the valve operating mechanism.

Referring particularly to Figures 13, 14 and 16 I show upstanding brackets 237 which form mounting means for stop pins 238. The stop pins 238 are adjustable in slots 239 formed in brackets 237 and prevent the normal upward movement of the levers 210 and 235 beyond a predetermined point. At the lower end of brackets 237 are bearings 240 forming guiding means for horizontally movable pins 241. The pins 241 are mounted upon the same axis but move away from each other in order to prevent any upward movement of the levers 210 and 235. The pins 241 are given their movement by the upward movement of counterweight 242. Counterweight 242 is provided with downwardly diverging slots 243 in which slide cross pins 244 secured to the ends of pins 241. Counterweight 242 is secured to a guide pin 245 sliding in bearing 246 and operated by a cable 247. The cable extends, as shown in Figure 11, to an operating pull handle 248, thus, if it is desired to dump an additional skip load, the operator pulls on the handle 248 thus raising counterweight 242 and causing the cross pins 244 to follow the diverging slots and the pins 241 to move in opposed directions into position to prevent upward movement of the levers 210 and 235, therefore, the extra raising of the small bell counterweight 242 will not disturb in any manner the sequence of operations.

Figure 18:
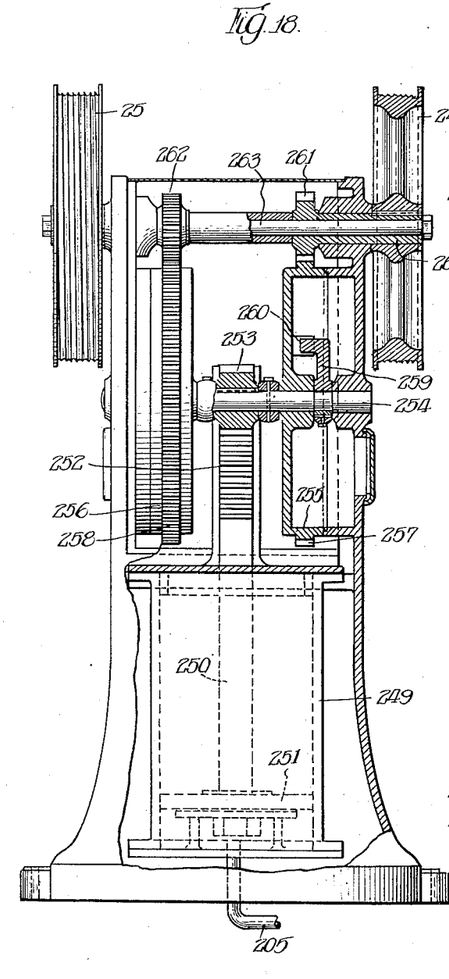
Figure 18 is a vertical elevation partially in section of the mechanism for operating the hoisting drums corresponding to the modified form of apparatus shown in Fig. 11.
Figure 19:
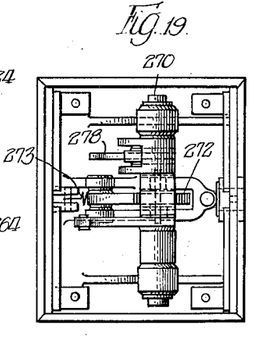
Figure 19 is a top plan view with the cover removed of the control box for operating the small bell.

Figure 18 shows a partly sectional view through housing 202, and illustrates a modified mechanism for causing the raising of the stock line plumbs 28 and 29. The air or steam from pipe 205 is admitted to the bottom of cylinder 249 in which is guided a piston 250 having a piston head 251. The piston rod 250 is formed at its upper end with rack teeth 252 which cooperate with a pinion 253. The pinion is keyed to a horizontal shaft 254 upon which are rotatably mounted drums 255 and 256 having formed on the outside thereof gears 257 and 258, respectively. The drums 255 and 256 are free to rotate upon shaft 254 and take positions corresponding to the level of the stock line plumbs, thus the electrical mechanism for indicating the burden level may be used in a similar manner as described with respect to Figure 2. The movement of the drums is caused by movement of the arms 259 which cooperate with pins 260 secured to the interior of the drums. The gears 257 and 258 mesh with pinion gears 261 and 262 which are loosely mounted upon an upper horizontal shaft 263. The gear 261 has integrally formed therewith a sleeve 264 on the end of which is keyed the sheave 24, similarly the gear 262 is connected to cause the rotation of the sheave 25. Thus in the operation of the stock line indicators, the plumbs 28 and 29 will drop until they reach the burden level and the sheaves 24 and 25 and drums 255 and 256 will take positions corresponding thereto. Upon the admission of air or steam from pipe 205 to piston cylinder 249, the piston 250 will move upward and cause a rotation of shaft 254. The rotation of shaft 254 will finally cause the drums to be picked up and turned to rotate the sheaves 24, 25 and lift the plumbs 28 and 29 to the top of the furnace, thus allowing the feeding of a new charge upon the opening of the large bell without interference by the plumbs 28 and 29.

Figure 20:
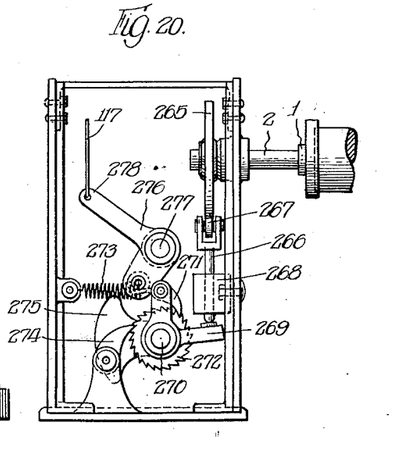
Figure 20 is a vertical elevation of the mechanism shown in Figure 19.

Lastly, with reference to this second type, Figure 20 shows a detail view of the mechanism enclosed in housing 200. The shaft 1 of the skip hoist drum has a small shaft 2 extending outwardly therefrom and attached at its end is a cam wheel 265 mounted within a housing 200 and cooperating with a vertically movable pin 266 and a cam roller 267. The pin is guided in a bracket 268 secured to the inside of the housing 200 and engages one arm of the bell crank lever 269. Bell crank lever 269 is pivoted on shaft 270 and carries a pawl 271 which cooperates with the ratchet wheel 272. Ratchet wheel 272 is keyed to shaft 270. The movement of the bell crank lever is caused by the tension of spring 273 which causes the pin to move upward and engage with the cam surface. Pivoted to a fixed bracket is shown a second pawl 274 preventing the reverse rotation of the ratchet wheel 272. Also secured to the shaft 270 is a bell lever 275 which rotates and engages one arm of a bell crank lever 276 pivotally mounted on shaft 277 above the shaft 270. The movement of bell crank lever 276 in a counter-clockwise direction causes the upwardly extending arm 278 to move downward and pull upon cable 117 which will cause the movement of valve lever 118 and the opening of small bell 120, as previously described.

In some installations it may be desired to somewhat modify the appaartus shown in Figure 11 by separating the lever, which is operated from the small bell air cylinder, from the pawl and ratchet means, for initiating the opening of the valve for the air or steam line connected to the means for raising the stock line plumbs. In such case I may mount a standard 280 adjacent to the small bell air cylinder and cause the movement of a vertically slidable lever 281 which is guided by a vertical shaft 282 having an adjustable stop 283. The lever 281 is connected at its inner end to a cable 284 which is suitably guided over pulleys 285 and connected to the mechanism shown in Figure 21 for initiating the operation of the valve mechanism. The mechanism shown in Figure 21 corresponds in general to Figure 12 except that the pawl actuating arm 210 is provided with a slot 286 in which is received a pin 287 secured to a vertically slidable rod 288 having its lower end attached to the cable 284. The cable is guided around suitable pulley devices 289. It will thus be seen that each upward movement of the air cylinder will allow the spring 215, pulling on one arm 214 of the bell crank lever, to raise the arm 210 and pull on cable 284. The cable 284 will thus pull the lever 281 vertically upward on its guide shaft to follow the movement of bracket 123 secured to the air cylinder 122.

Figures 21, 22:
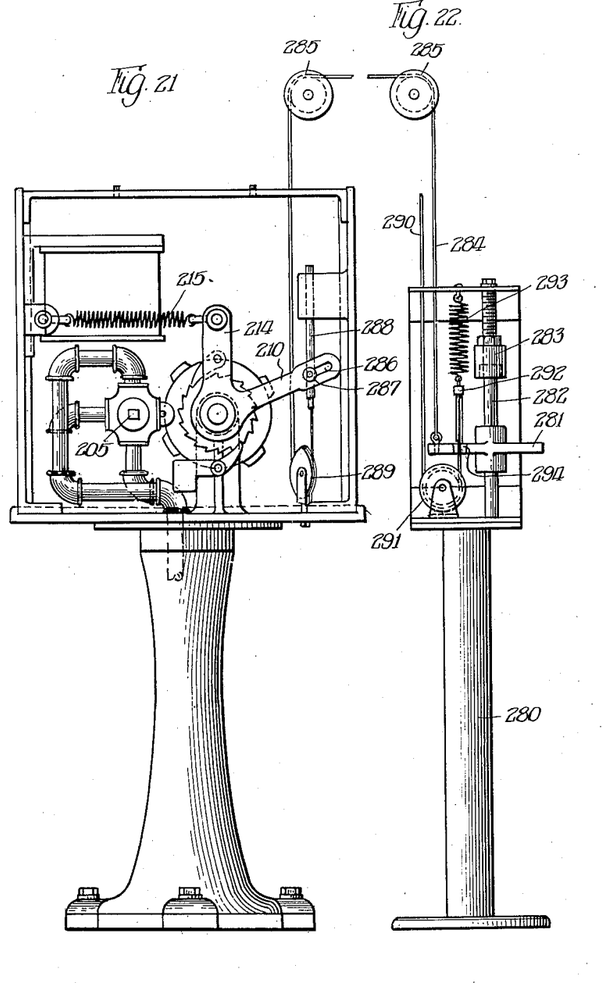
Figures 21 and 22 are vertical elevations of separated mechanisms for forming corresponding functions to a portion of the apparatus shown in Fig. 12.
Figure 23:
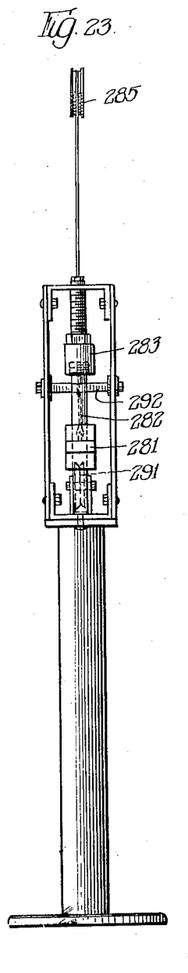
Figure 23 is a vertical elevation from the right hand end of Fig. 22.

In Figure 22 I also show a cable 290 which is guided by pulley 291 and to a slidable stop member 292 and then to a spring 293. The cable 290 passes through an opening 294 provided in the inner end of the lever 281 whereby a pull on the cable 290 by the operator will slide the stop 292 downward and prevent movement of the lever 281 upon the raising of the air cylinder 122. Thus the operator may dump an extra skip load without disturbing the sequence of the following operations.

As an additional modified form of apparatus I may, in some cases, desire to use an enlarged foot on the lower end of the stock line plumb. The enlarged foot has some advantages in that it prevents the plumb from dropping through a small hole which may occur in the burden and thus giving an incorrect indication of the actual burden level within the furnace, but together with the advantages of giving a more correct indication most of the time, it has the disadvantage of requiring a greater amount of force to lift it upwards should it shake down and be covered up by the burden, that is, if the burden of material is above the upper surface of the enlarged foot, a greater amount of force is required to move the plumb upward. I have, therefore, found that I am unable to use the air cylinder shown in my plan of apparatus illustrated in Figure 11, unless I materially increase the size of my apparatus. It is desired, of course, to keep the relative height and weight of the different control boxes and operating units as small as possible. Therefore, I show in Figures 24 and 25, a modified design in which the plumbs are raised through the action of a steam turbine hoist.

Figures 24, 25:
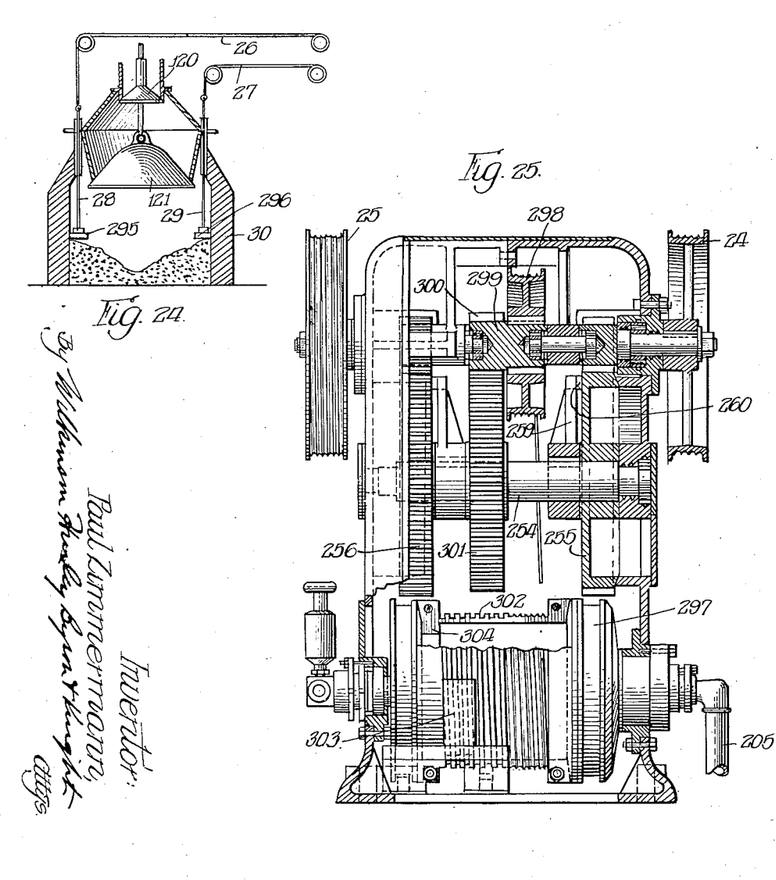
Figure 24 is a diagrammatic view of the top of a blast furnace showing a modified form of stock line plumb.
Figure 25 is a vertical elevation partially in section of the modified form of hoisting means for operating the stock line plumbs.
Figure 26:
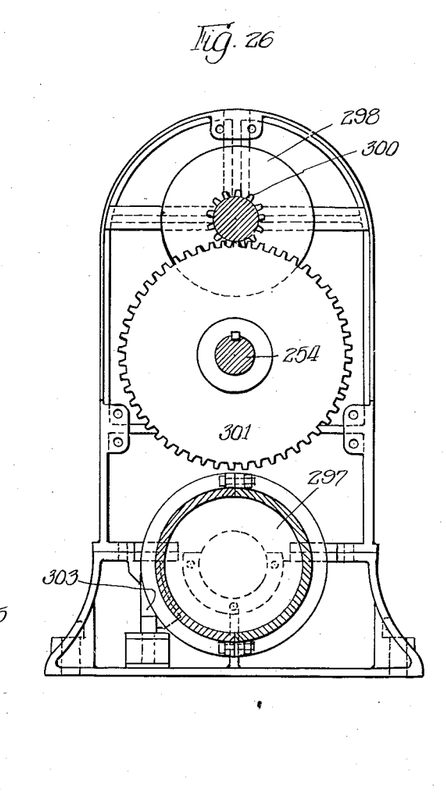
Figure 26 is a vertical end elevation partially in section of Fig. 25.

Figure 24 shows the top of the furnace and corresponds to Figure 11 except that the plumbs 28—29 are provided with enlarged feet 295—296, the weight of which is somewhat balanced by increasing the size of the counterweight.

Figure 25 shows the hoisting mechanism and corresponds in general to Figure 18 except that the pipe line 205 may be connected to a source of steam instead of air and controls a rotating steam hoist drum generally indicated as 297. The hoist drum 297 is connected by a cable to an upper hoist drum 298 which is keyed to a horizontal pin shaft 299. A pinion 300 is formed integral with the shaft 299 and meshes with a gear 301. The gear 301 is keyed to and rotates the shaft 254. It will be noted, however, that the stop members 260 are formed on the exterior of the drums 255—256 and cooperate with rotating arms 259 keyed to shaft 254. The movement of the cable sheaves 24—25 for raising the stock line plumbs is similar to that previously described. A portion of the exterior of the steam turbine hoist 297 is provided with screw threads 302 which mesh with a horizontally traveling stop member 303 which is guided to slide parallel with the axis of the steam hoist drum. At the end of its movement to the left, a cooperating stop member 304 which is secured to the steam turbine hoist drum will engage with the stop member 303 and prevent further movement of the drum. At that time the stock line plumbs will be raised to the limit of their movement. It is apparent that the steam pressure will hold the plumbs in that position until the valve 205 is opened to permit the steam to exhaust. The weight of the plumbs will then be sufficient to rotate the mechanism in the opposite direction until the plumbs have reached the burden level. With this type of operating means the mechanical and electrical indicating means could be used in a manner similar to that previously described.

I claim:

In apparatus for the control of blast furnaces, a plurality of stock line plumbs, a plurality of freely rotatable sheaves adapted to be turned by cables connected to said plumbs, a plurality of gear wheels each of which is in driving relation with one of said sheaves, a rotatable raising member having a successive pick-up connection with each of said gear wheels whereby one revolution of said member is sufficient to pick up each of said gear wheels and move all the stock line plumbs to the top of the furnace and independent indicating means for each of said stock line plumbs actuated in accordance with the proportionate movement of the corresponding gear wheel.

PAUL ZIMMERMANN.